United States Patent Office 3,505,416
Patented Apr. 7, 1970

3,505,416
PREPARATION OF 1,1-DIFLUORO-2-BROMOETHYLENE
Ralph A. Davis, Midland, and Ronald G. Tigner, Coleman, Mich., assignors to The Dow Chemical Company, Midland, Mich., a corporation of Delaware
No Drawing. Filed Sept. 5, 1968, Ser. No. 757,748
Int. Cl. C07c *19/08, 21/14, 21/18*
U.S. Cl. 260—653.3      4 Claims

ABSTRACT OF THE DISCLOSURE 1,1-difluoro-2-bromoethylene is prepared by contacting a solution of 1,1-difluoro-1,2,2,2-tetrabromoethane in a lower alkanol with excess granulated zinc or magnesium.

BACKGROUND OF THE INVENTION 1,1-difluoro-2-bromoethylene ($CF_2$=CHBr) is usually prepared by the dehydrobromination of 1,1-difluoro-1,2-dibromoethane ($CF_2BrCH_2Br$) or the debromination of 1,1-difluoro-1,2,2-tribromoethane ($CF_2BrCHBr_2$). These two reactants are usually prepared by the direct bromination of 1,1-difluoroethane, but the composite reaction product contains 10 to 20% of the undesirable 1,1-difluoro-1,2,2,2-tetrabromoethane. This is taught by Davis and Broadworth in I. and E. C. Product Research and Development 5, 337, December 1966. In the prior art, there is no convenient method for converting the 1,1-difluoro-1,2,2,2-tetrabromoethane into 1,1-difluoro-2-bromoethylene.

SUMMARY OF THE INVENTION 1,1-difluoro-2-bromoethylene is produced by the reduction and debromination of 1,1-difluoro-1,2,2,2-tetrabromoethane. This reaction occurs by contacting an alcoholic solution of 1,1-difluoro-1,2,2,2-tetrabromoethane with zinc or magnesium.

The 1,1-difluoro-1,2,2,2-tetrabromoethane is readily available as a by-product of the bromination of 1,1-difluoroethane.

The metal is added in an excess molar amount. The best results are obtained by an excess of approximately 1.5 atoms of active metal per mole of 1,1-difluoro-1,2,2,2-tetrabromoethane. A greater excess could be used, but the results of the reaction are not substantially affected.

Absolute methanol, ethanol and propanol are suitable reactive solvents for the reaction. An excess of the alcohol gives the best results.

Upon addition of the 1,1-difluoro-1,2,2,2-tetrabromoethane to the mixture of metal and alcohol, the reaction is initiated without the addition of heat. After all the reactant has been added, the mixture is preferably refluxed to assure complete reaction.

SPECIFIC EMBODIMENTS

A one liter, three-neck flask was equipped with a stirrer, thermometer, addition funnel and a reflux condenser which was followed by a Dry-Ice cooled trap. The flask was charged with a 269 grams (4.14 moles) of granulated zinc and 200 ml. of absolute ethanol. A sample of residue containing 93.3% of 1,1-difluoro-1,2,2,2-tetrabromoethane (1.53 moles) was dissolved in 280 ml. of absolute ethanol. This mixture was added slowly to the above flask with stirring and the reaction initiated without the addition of heat. The reaction was held at reflux during the addition and was refluxed two hours after all of the reaction mixture had been added.

199 grams of product were recovered from the Dry-Ice trap. The product was analyzed and found to contain 90.1% (1.255 moles) of 1,1-difluoro-2-bromoethylene 1.29% ethanol and several impurities formed from the impurities in the starting materials. Thus, 82% of the $CF_2BrCBr_3$ charged in the reaction flask was converted to $CF_2$=CHBr.

Similar results are obtained when the zinc is replaced with an equivalent amount of magnesium turnings and when the ethanol is replaced with other lower alkanols, such as methanol or propanol.

We claim:
1. The process for the preparation of 1,1-difluoro-2-bromoethylene comprising reacting by contacting a solution of 1,1-difluoro-1,2,2,2-tetrabromoethane in a lower alkanol with a molar excess of zinc or magnesium metal.
2. The process defined in claim 1 wherein the metal is zinc.
3. The process defined in claim 1 wherein the metal is magnesium.
4. The process defined in claim 1 wherein the alcohol contains from 1 to 3 carbon atoms.

References Cited
UNITED STATES PATENTS
2,920,112    1/1960    Larsen.

DANIEL D. HORWITZ, Primary Examiner